July 25, 1967  N. A. RANDALL ET AL  3,333,082

BRAZING TOOL

Filed Nov. 19, 1964

Inventors
Nathan A. Randall
Alfred E. Israel
By Robert B. Benson
Attorney

United States Patent Office 3,333,082
Patented July 25, 1967

3,333,082
BRAZING TOOL
Nathan A. Randall and Alfred E. Gruel, West Allis, Wis., assignors to Allis-Chalmers Manufacturing Company, Milwaukee, Wis.
Filed Nov. 19, 1964, Ser. No. 412,440
5 Claims. (Cl. 219—85)

This invention relates generally to brazing of copper conductors. More specifically this invention relates to a brazing fixture utilizing carbon blocks having a bellows positioned behind the carbon blocks so as to assure a uniform contact between the blocks and the material being brazed.

It is common in the art to braze the copper conductors of dynamoelectric machines by clamping the conductors coated with a solder filler material between carbon plates and then applying a high current to these carbon plates. This method has a couple of serious problems in that the temperature at which the filler material will melt and fuse with the copper conductors is just slightly less than the temperature at which the copper conductors will melt. Hence, the temperature range in which the carbon brazing tool can be operated is very narrow and critical. In the past it has been found that the carbon blocks did not have a uniform contact with the material being brazed. As a result, a number of hot spots were formed against the material being brazed which caused excessive heat and melting of the conductors at these particular points while at other places there was not sufficient heat provided to melt the filler and causing the brazing of the conductor. Attempts have been made to overcome this problem by applying large clamping forces to the carbon blocks in an effort to assure uniform contact. However, efforts in this direction have for the most part been ineffective because both the carbon blocks and the clamps are rigid materials and, hence, the clamping force is not uniformly distributed through the carbon blocks.

This invention overcomes the problems mentioned above by providing a carbon face for engaging the material to be brazed that is made up of a plurality of separate carbon blocks backed by a bellows member. The flexibe bellows member is supplied with water under relatively high pressure which asserts a uniform pressure against the various blocks and causes them to move in response to the pressure within the bellows and makes a firm, flat contact against the work being treated. Furthermore, the water circulating through the bellows provides a good means of carrying away excessive heat generated in the brazing operation. Tests utilizing the brazing fixture of this invention have indicated a much better, more uniform braze than with anything utilized in the prior art. Furthermore, it has been found much easier to maintain a uniform temperature over the entire surface to be brazed than with the prior art structure which makes it simpler to perform the brazing operation.

Therefore, it is the object of this invention to provide a new and improved carbon brazing fixture.

Another object of this invention is to provide a new and improved brazing fixture utilizing a plurality of carbon blocks backed by a bellows member so as to apply a uniform pressure between the carbon blocks and the material being brazed.

Other objects and advantages of this invention will be apparent from the following description when read in connection with the accompanying drawing, in which.

Figure 2:
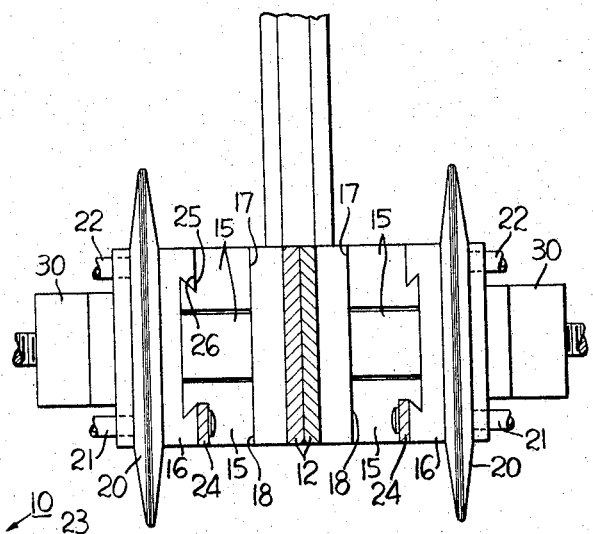
FIG. 2 is a top view taken along the line II—II of FIG. 1.
Figure 1:
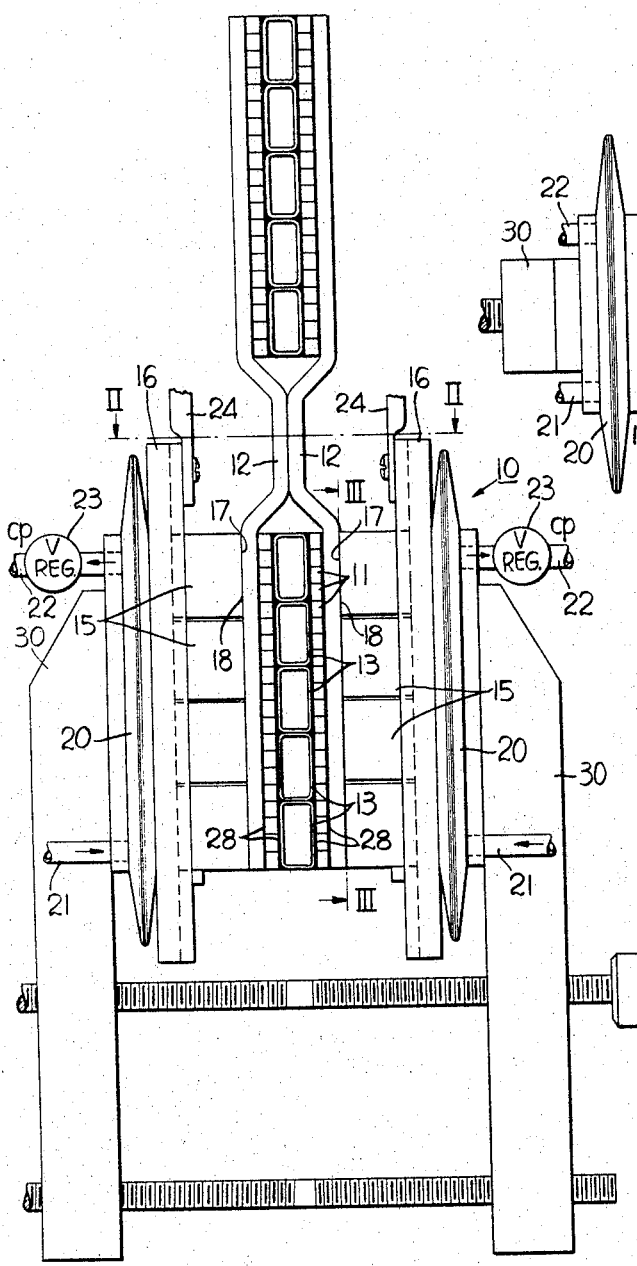
FIG. 1 is an end view of a carbon brazing tool of this invention.
Figure 3:
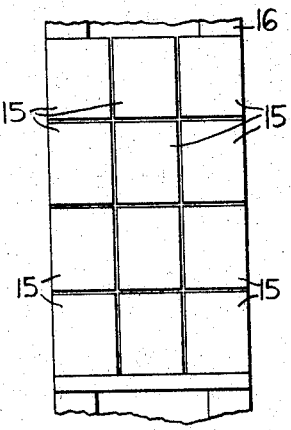
FIG. 3 is a view taken along the line III—III of FIG. 1 showing the carbon blocks.

Referring more specifically to the drawing by characters of reference, the brazing tool 10 of this invention is illustrated in connection with the brazing of the coil strands 11 of a dynamoelectric machine to a copper clip 12 for connecting the coil ends together. Intermediate the end portions of the strands are a plurality of stainless steel cooling ducts 13. The copper clip 12 extends alongside and outside of the copper conductor strands.

The brazing tool 10 comprises a plurality of rectangular carbon heating blocks or elements 15. The carbon blocks are mounted in thin flexible backup plates or holders 16 in such a way that one of their flat surfaces 17 engages the flat outer surface 18 of the clip 12.

Immediately adjacent the backup plates are bellow members 20. The bellow members have an inlet 21 and an outlet 22. Appropriate valves 23 are positioned in the outlet conduit to maintain the pressure of the liquid in the bellows at a predetermined value. In the type of insulation being discussed here, 40 lbs. per square inch is considered an appropriate pressure for the liquid within the bellows. Hence, water is brought in at slightly more than 40 lbs. per square inch and is metered out in such a way that the pressure within the bellows is approximately 40 lbs. per square inch. Water is continually circulated through the bellows member to act as a cooling agent to remove heat from the brazing tool.

The backup plate 16 is sufficiently flexible that it tend to move in response to the pressure of the bellows member. Hence, the backup plate exerts an independent pressure on each of the carbon blocks so that the carbon blocks will move independently and orient themselve relative to the surface of the clamping clip immediatel adjacent thereto. In this way a maximum portion of th surface of each block 15 is in firm engagement with th surface of the clip. This in turn provides an even distribu tion of current and heat from the blocks to the clip an thus avoids the formation of hot spots.

The backup plate 16 which is preferably made of relatively thin copper material is connected to an appro priate source of current such as the secondary windin of a transformer by leads 24. The current path goe from the source to one backup plate across the carbo heater elements, the clip, the conductor strands, to th other backup plate and back to the source. In additio the backup plate may be provided with V-shaped proje tions 25 that fit into V-shaped grooves 26 in blocks 15 t hold the blocks in position.

An appropriate solder filler 28 is positioned betwee each of the coil strands and the clip to assure a prop bonding of the materials being soldered.

In operation, the clips are positioned on either side the rows of conductor strands and the appropriate fill material is positioned between the stainless steel coolir ducts, the conductors and the conductor clips. Then tl carbon blocks and backer elements are positioned c either side of the clips and the bellows element position behind the backer element. The entire assembly is the clamped together by an appropriate clamping plate 30 force the carbon heater elements against the conduct clip. The valves on the bellows member are opened ar adjusted so that water is continually flowing through tl bellows element but that the pressure of the liquid in tl bellows is approximately 40 lbs. per square inch. Cu rent is then applied to the backup elements and across t carbon blocks and coil strands until the carbon is a brig cherry red which means that it is at approximately 1650 F. The current is then cycled on and off to maintain t carbon at the cherry red heat until all of the brazing fill between the strand and the clip is melted and fused the clip and strands. Then the current is shut off and t brazed joint is allowed to cool. While the joint is coolir water continues to be circulated through the bellows mer ber to transfer heat from the brazed joint. After the joint cools sufficiently, the assembly is dismantled.

Although but one embodiment of this invention has been illustrated and described, it will be apparent to those skilled in the art that various modifications and changes can be made herein without departing from the spirit of the invention or the scope of the appended claims.

The embodiments of the invention in which an exclusive property or privilege is claimed are defined as follows:

1. A brazing device comprising:
   a pair of oppositely facing sets of carbon blocks, each said set having a plurality of blocks having a flat surface for engaging the work to be brazed,
   a pair of low resistant electrically conductive flexible backing members said blocks, engaging each at a source of high electrical current connected to said members in a manner to cause said current to flow through said backing members, blocks and work to be brazed,
   a bellows positioned adjacent each of said flexible members on the opposite side from said blocks,
   and means for supplying fluid under pressure to the interior of said bellows to exert an independent pressure on each of said blocks through said flexible backing member and thereby obtain a maximum surface contact between said blocks and the material to be brazed.

2. A brazing device comprising:
   a pair of oppositely facing sets of carbon blocks, each said set having a plurality of blocks having a flat surface for engaging the work to be brazed,
   a pair of low resistant electrically conductive flexible backing members for receiving said blocks, said members being connected in a series circuit to a source of high current, said series circuit including said sets of blocks and said work to be brazed,
   a bellows positioned adjacent each of said flexible members on the opposite side from said blocks,
   and means for supplying fluid under pressure to the interior of said bellows to exert an independent pressure on each of said blocks through said flexible backing member and thereby obtain a maximum surface contact between said blocks and the material to be brazed.

3. The brazing device of claim 2 having means for selectively making and breaking said circuit to control the amount of current supplied to said blocks and thereby control the temperature of said blocks.

4. The brazing device set forth in claim 1 and further comprising a clamping plate mounted behind each of said bellows and joined together to exert a clamping pressure on the work and to form a relatively stationary member against which a force can be exerted to apply pressure on said blocks.

5. The brazing device set forth in claim 1 and further including an inlet conduit and an outlet conduit connected to said bellows, and pressure regulating valves in said outlet conduit to maintain the pressure within said bellows at a predetermined magnitude while said fluid is continuously flowing through said bellows to cool said device.

References Cited

UNITED STATES PATENTS

| | | | |
|---|---|---|---|
| 645,066 | 3/1900 | Brown et al. | 219—117 |
| 1,772,444 | 8/1930 | Giacchino | 219—119 X |
| 1,918,226 | 7/1933 | Gilbert | 219—119 |
| 2,266,424 | 12/1941 | Humphrey | 219—119 |
| 3,053,969 | 9/1962 | Kerr et al. | 219—85 |
| 3,069,535 | 12/1962 | Vickers | 219—119 X |
| 3,093,104 | 6/1963 | Bukata | 219—85 |

RICHARD M. WOOD, *Primary Examiner.*

JOSEPH V. TRUHE, *Examiner.*

B. A. STEIN, *Assistant Examiner.*